(12) United States Patent
Weber et al.

(10) Patent No.: US 7,981,944 B2
(45) Date of Patent: Jul. 19, 2011

(54) PHOTOCURABLE ADHESIVE COMPOSITION AND ITS USE IN THE OPTICAL FIELD

(75) Inventors: Steven Weber, Clearwater, FL (US);
Peiqi Jiang, Tarpon Springs, FL (US);
Yassin Turshani, Largo, FL (US); Aref Jallouli, Largo, FL (US)

(73) Assignee: Essilor International Compagnie Generale d'Optique, Charenton-le-Pont (FR)

(*) Notice: Subject to any disclaimer, the term of this patent is extended or adjusted under 35 U.S.C. 154(b) by 939 days.

(21) Appl. No.: 10/553,488

(22) PCT Filed: Apr. 15, 2004

(86) PCT No.: PCT/EP2004/004114
§ 371 (c)(1),
(2), (4) Date: Aug. 9, 2006

(87) PCT Pub. No.: WO2004/092787
PCT Pub. Date: Oct. 28, 2004

(65) Prior Publication Data
US 2007/0087123 A1    Apr. 19, 2007

Related U.S. Application Data

(63) Continuation-in-part of application No. 10/417,525, filed on Apr. 17, 2003, now abandoned.

(51) Int. Cl.
*C08F 228/02* (2006.01)

(52) U.S. Cl. ........ 522/180; 522/182; 522/184; 522/186; 252/600

(58) Field of Classification Search .................. 526/286, 526/319, 320, 323.1, 328; 522/180, 182, 522/183, 184, 186; 252/600
See application file for complete search history.

(56) References Cited

U.S. PATENT DOCUMENTS

| | | | |
|---|---|---|---|
| 4,606,864 A | 8/1986 | Warren | 558/257 |
| 5,384,379 A | 1/1995 | Bader et al. | 526/286 |
| 5,741,831 A * | 4/1998 | Keita et al. | 523/106 |
| 6,184,323 B1 * | 2/2001 | Jiang | 526/286 |
| 6,206,550 B1 * | 3/2001 | Fukushima et al. | 362/335 |
| 6,369,269 B2 | 4/2002 | Kobayashi et al. | 560/226 |
| 6,479,606 B1 * | 11/2002 | Jiang et al. | 526/256 |

(Continued)

FOREIGN PATENT DOCUMENTS
EP    273661    7/1988
(Continued)

OTHER PUBLICATIONS

Polymer Handbook, 3$^{rd}$ Ed., John Wiley and Sons, New York, 524-525, 1989.

*Primary Examiner* — David Wu
*Assistant Examiner* — Vu A Nguyen
(74) *Attorney, Agent, or Firm* — Fulbright & Jaworski L.L.P.

(57) ABSTRACT

The invention concerns a photocurable adhesive composition comprising, based on total weight of photopolymerizable monomers and/or oligomers of the composition: 5 to 60 wt % of at least one mono or polyacrylate monomer or oligomer thereof (A); 5 to 50 wt % of at least one thio(meth)acrylate monomer or oligomer thereof (B); and 20 to 50 wt % of at least one aromatic dimethacrylate monomer or oligomer thereof (C); with the proviso that the composition does not contain a brominated monofunctional acrylate.

64 Claims, 3 Drawing Sheets

U.S. PATENT DOCUMENTS

| | | | |
|---|---|---|---|
| 6,699,953 B2 * | 3/2004 | Oshikiri et al. | 526/289 |
| 2003/0017340 A1 | 1/2003 | Jiang et al. | 428/412 |

FOREIGN PATENT DOCUMENTS

| | | |
|---|---|---|
| EP | 273710 | 7/1988 |
| EP | 384725 | 8/1990 |
| JP | 63316766 | 12/1988 |
| WO | WO 99/29494 | 6/1999 |
| WO | WO 01/94430 | 12/2001 |
| WO | WO 03/011925 | 2/2003 |

* cited by examiner

PHOTOCURABLE ADHESIVE COMPOSITION AND ITS USE IN THE OPTICAL FIELD

This application is a national phase application under 35 U.S.C. §371 of International Application No. PCT/EP2004/004114 filed 15 Apr. 2004, which claims priority as a continuation-in-part to U.S. patent application Ser. No. 10/417,525 filed 17 Apr. 2003 now abandoned. The entire text of each of the above-referenced disclosures is specifically incorporated herein by reference without disclaimer.

BACKGROUND OF THE INVENTION

The present invention relates to a photocurable adhesive composition and its use in the optical field.

It is a common practice in the art to coat at least one face of an ophthalmic lens with several coatings for imparting to the finished lens additional or improved optical or mechanical properties.

Thus, it is usual practice to coat at least one face of an ophthalmic lens, typically made of an organic glass material, with successively, starting from the face of the lens, an impact resistant coating (impact resistant primer), a scratch resistant coating (hard coat), an anti-reflecting coating and, optionally, a hydrophobic top coat. Other coatings such as polarized coating, photochromic or dying coating may also be applied onto one or both faces of the ophthalmic lens.

Numerous processes and methods have been proposed for coating a face of an ophthalmic lens and are disclosed.

US 2003/0017340 describes one process or method for transferring a coating from at least one mold part onto at least a geometrically defined surface of a lens blank comprising providing a lens blank having at least one geometrically defined surface;

providing a support or mold part having an internal surface bearing a coating and an external surface;

depositing on said geometrically defined surface of said lens blank or on said coating a pre-measured amount of a curable adhesive composition;

moving relatively to each other the lens blank and the support to either bring the coating into contact with curable adhesive composition or bring the curable adhesive composition into contact with the geometrically defined surface of the lens blank;

applying a sufficient pressure onto the external surface of the support so that the thickness of a final adhesive layer once the curable composition cured is less than 100 micrometers;

curing the layer of adhesive composition; and withdrawing the support or mold part to recover the lens blank with the coating adhered onto the geometrically defined surface of said lens blank.

By pre-measured amount, one means a sufficient amount of curable adhesive composition to obtain transfer and adhesion of the coating to the lens blank.

Preferably the coating is transferred to the back surface of the lens blank (back side treatment or BST).

The curable adhesive composition not only must allow a quick and safe transfer of the coating from the support onto the lens blank surface and a good adhesion of the coating onto the lens blank surface but also must not impair the optical and mechanical properties of the resulting ophthalmic lens, such as good adhesion, haze, no application stain and resistance to thermal cracking (critical temperature).

Application stain refers to the existence of an area of increased haze level, on the lens blank, coinciding with the initial adhesive composition application area. The Haze may be observed if the adhesive composition was allowed to sit on the lens blank surface for longer than 20 seconds before undergoing the surface transfer process.

Additionally, the cured adhesive composition layer must have a refractive index close to that of the substrate.

SUMMARY OF THE INVENTION

Thus, an object of the invention is to provide a photocurable adhesive composition which overcomes the drawbacks of the prior art curable adhesive compositions, in particular for use in a coating transfer process;

a further object of the invention is to provide a photocurable adhesive composition as above which not only results in a good adhesion of the coating onto the substrate but also does not impair the optical and mechanical properties of the final product, in particular haze, application stain and resistance to thermal cracking.

Another object of the invention is to provide a photocurable adhesive composition as above which after curing has a refractive index close to that of the substrate.

These and other objects which will become apparent in the following description are reached according to the invention by providing a photocurable adhesive composition comprising, a percentage of at least one mono or polyacrylate monomer or oligomer thereof (A); a percentage of at least one thio(meth)acrylate monomer or oligomer thereof (B); and a percentage of at least one aromatic dimethacrylate monomer or oligomer thereof (C) with the proviso that the composition does not contain a brominated monofunctional acrylate.

More specifically, the photocurable adhesive composition of the invention comprises, based on the total weight of photopolymerizable monomers and/or oligomers:

5 to 60 wt % of (A);
5 to 50 wt % of (B); and
20 to 50 wt % of (C).

Preferably, the photocurable adhesive composition invention comprises:

at least 15 wt % of (A);
at least 9 wt % of (B); and
at least 25 wt % of (C):

In preferred embodiments, the invention involves a photocurable adhesive composition comprising 20 to 60 wt % (A); 20 to 50 wt % (B); and 20 to 40 wt % (C) with the understanding that the composition cannot contain more than 100% total of (A), (B), and (C). Some more preferred embodiments of the invention relate to a photocurable adhesive composition comprising, based on the total weight of the photopolymerizable monomers and/or oligomers of the composition: 20 to 60 wt % (A); 30 to 50 wt % (B); and 20 to 40 wt % (C); with the proviso that the composition does not contain a brominated monofunctional acrylate. In some more specific embodiments, the photocurable adhesive composition comprises 20 to 50 wt % (A); 30 to 50 wt % (B); and 20 to 40 wt % (C). In even more specific embodiments, the photocurable adhesive composition may comprise 20 to 40 wt % (A); 35 to 45 wt % (B); and 25 to 35 wt % (C).

Preferably, the photocurable adhesive composition does not contain any brominated acrylate.

More preferably, the photocurable adhesive composition does not contain any monomer including a bromo atom.

In a preferred embodiment, the mono or polyacrylate monomers (A) have a calculated solubility parameter ranging from 8 to 12, preferably 8.5 to 11.5 $(cal/cm^3)^{1/2}$.

Also, the preferred mono or polyacrylate monomers (A) have a molecular weight less than 500, preferably $\leq 350$.

For each component of the composition, the oligomer has preferably a molecular weight less than 10000.

Most preferably, no oligomer is present in the photocurable adhesive composition.

The present invention also concerns a process or method for transferring a coating from a support onto a surface of a thermoplastic material substrate comprising:

providing a thermoplastic material substrate having at least one main surface;

providing a support having an internal surface bearing a coating and an external surface;

depositing on said main surface of the substrate or on said coating a pre-measured amount of a curable adhesive composition;

moving relatively to each other the substrate and the support to either bring the coating into contact with the curable adhesive composition or bring the curable adhesive composition into contact with the main surface of the substrate;

applying a sufficient pressure onto the external surface of the support so that the thickness of a final adhesive layer once the curable composition has cured is less than 100 µm;

curing the layer of adhesive composition; and withdrawing the support to recover a substrate with the coating adhered onto the main surface of the substrate, wherein the curable adhesive composition is a photocurable adhesive composition as defined above.

The present invention also concerns an overmolding process which comprises:

providing a thermoplastic material substrate having at least one main surface;

providing a mold part having an internal surface and an external surface;

depositing on said main surface of the substrate or on said internal surface of the mold part a pre-measured amount of a curable adhesive composition as disclosed above;

moving relatively to each other the substrate and the mold part to either bring the internal surface of the mold part or the main surface of the substrate in contact with the curable adhesive composition;

applying a sufficient pressure onto the external surface of the mold part to uniformly spread the curable adhesive composition and form a uniform layer, once cured, having a thickness of at least 200 µm;

curing the layer of adhesive composition; and withdrawing the mold parts to recover the substrate overmolded with a cured layer of the curable adhesive composition.

The overmolded cured layer of adhesive composition has preferably a thickness of at least 500 µm.

By internal surface of the support or the mold part, we mean the surface of the support or the mold part facing one main surface of the thermoplastic material substrate.

The present invention further concerns a process for making laminated thermoplastic articles such as laminated ophthalmic lenses, which comprises depositing a pre-measured amount of a photocurable adhesive composition on a main surface of a first part made of thermoplastic material, bringing into contact the deposited photocurable adhesive composition with a main surface of a second part made of thermoplastic material, pressing the first and second parts against each other to uniformly spread the curable adhesive composition to form a uniform thin layer and photocuring the thin layer to obtain a laminated article, wherein the photocurable adhesive composition is as defined above.

Preferably, the parts are ophthalmic lens elements and are made of polycarbonate.

By pre-measured amount, one means a sufficient amount of photocurable adhesive composition to obtain transfer and adhesion of the coating or overmolding of the substrate or adhesion of the two parts.

BRIEF DESCRIPTION OF THE DRAWINGS

The foregoing and other objects, features and advantages of the present invention will become readily apparent to those skilled in the art from a reading of the detailed description hereafter when considered in conjunction with the accompanying drawings wherein.

DETAILED DESCRIPTION OF THE PREFERRED EMBODIMENT

Figure 1A:
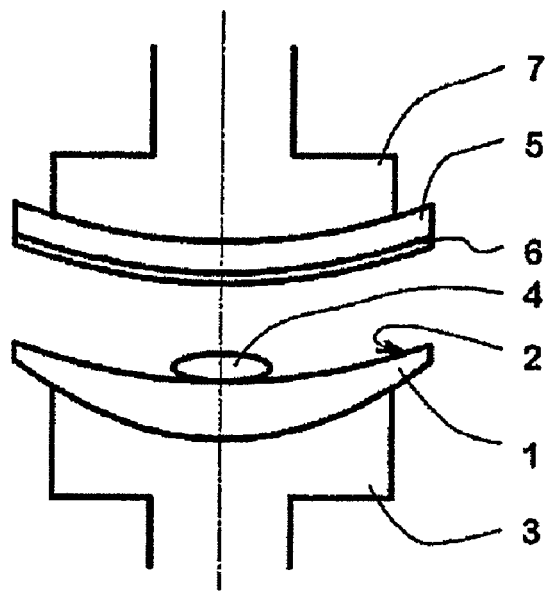
FIGS. 1A to 1C are schematic views of the main steps of a first embodiment of the process of the invention for transferring a coating onto an optical surface of a lens blank.

The first component (A) of the photocurable adhesive composition of the invention consists of at least one mono or polyacrylate monomer, preferably a diacrylate monomer or oligomer thereof. Preferably, mono or polyacrylate monomers (A) have a solubility parameter ranging from 8 to 12 $(cal/cm^3)^{1/2}$, preferably from 8.5 to 11.5 $(cal/cm^3)^{1/2}$ and a molecular weight of less than 500, preferably of 350 or less and typically between 200 and 300, most preferably between 200 and 275.

The solubility parameters of the acrylate monomers (A) are calculated using the group distribution method, using in the calculation the group values as determined by Hoy (Hoy's group contribution values can be found in Band Up J, and E. H. Immerget, ed S. Polymer Handbook $3^{rd}$ ed. John Wiley and Sons, New York 1989) [pages 524-525).

Preferably, the acrylate monomers (A) are non aromatic acrylate monomers. Also preferably, the acrylate monomers (A) are low refractive index acrylate monomers.

By low refractive index acrylate monomers it is meant acrylate monomers which by homopolymerisation result in homopolymers having refractive indices, $n_D^{25}$, ranging from 1.47 to 1.53.

Among the preferred acrylate monomers (A) there may be cited

|  | Calculated Solubility parameters $(cal/cm^3)^{1/2}$ | Molecular weight |
|---|---|---|
| Diethyleneglycoldiacrylate | 9.44 | 214 |
| Triethyleneglycoldiacrylate | 9.40 | 258 |
| Tetraethyleneglycoldiacrylate | 9.46 | 302 |
| Neopentylglycoldiacrylate | 8.56 | 212 |
| 1,6-hexanedioldiacrylate | 8.84 | 226 |
| Tetrahydrofurfuryleacrylate | 8.99 | 156 |

Of course mixtures of acrylate monomers may be used for component (A).

In particular, component (A) may comprise a mixture of non aromatic acrylate monomers and aromatic acrylate monomers, preferably aromatic monoacrylate monomers such as benzylacrylate.

A preferred mixture for component (A) is a mixture of diethyleneglycoldiacrylate and benzylacrylate.

Typically, the aromatic acrylate monomers represent 10 to 30%, preferably 10 to 25 wt %, and more preferably 10 to 20 wt %, of the total weight of polymerizable monomers and/or oligomers of the composition.

Component (A) represents 5 to 60%, preferably 20 to 60%, and more preferably 25 to 40% by weight of the total weight of the photopolymerizable monomers and/or oligomers of the composition.

The second component (B) of the photocurable adhesive composition according to the invention consists of a least one thio(meth)acrylate monomer or oligomer thereof.

In the meaning of the present invention a thio(meth)acrylate monomer is a compound having at least one thio(meth)acrylate functional group, preferably two thio(meth)acrylate functional groups, of formula:

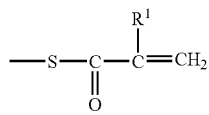

wherein $R^1$ is H or —$CH_3$.

Preferably, monomers of component (B) are of formula:

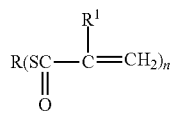
(I)

wherein R is a linear or branched, monovalent or polyvalent, aliphatic hydrocarbon radical, or a monovalent or polyvalent aromatic group directly linked to the sulfur atom of the thio(meth)acrylate group(s) through an aromatic ring or by means of a linear alkyl chain, the radical R may include in its chain one or more groups selected from:

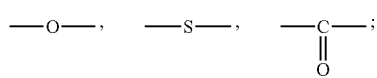

$R^1$ is H or —$CH_3$; and n is an integer from 1 to 6, preferably from 1 to 3.

Among the linear or branched, monovalent R radicals, there may be cited the linear or branched ($C_1$-$C_5$) alkyl radicals and the radicals of formula:

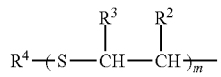

wherein $R^2$ and $R^3$ are, independently from each other, H or a linear or branched ($C_1$-$C_5$) alkyl radical, $R^4$ is a linear or branched ($C_1$-$C_5$) alkyl radical, a ($C_1$-$C_7$) aralkyl radical or a ($C_6$-$C_{12}$) aryl radical, optionally substituted, in particular with alkyl groups and/or halogens, and m is an integer from 1 to 4.

Among the preferred monovalent R radicals, there may be cited:

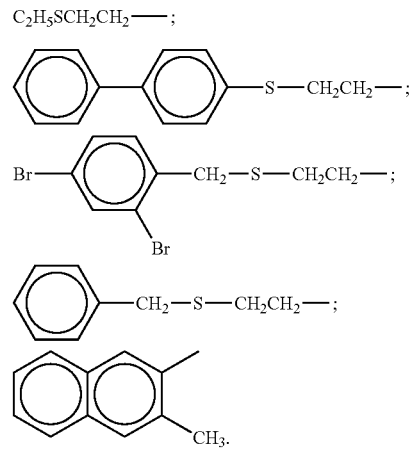

Monomers of formula (I) for which n=1 and as defined above, are disclosed in particular in patents U.S. Pat. No. 4,606,864, JP-63316766 and EP-A-0384725.

Among the divalent R radicals within the scope of monomers of formula (I), there may be cited linear or branched ($C_2$-$C_{10}$) alkylene radicals, optionally having in their chains one or more groups:

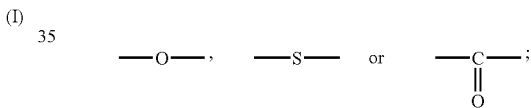

alkylidene radicals of formula:

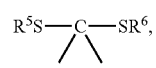

in which $R^5$ and $R^6$ are ($C_1$-$C_5$) radicals;
radicals of formula:

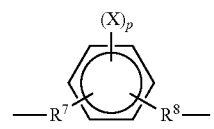

in which $R^7$ and $R^8$ are linear or branched ($C_1$-$C_5$) alkylene groups, optionally having in their chains one or more groups

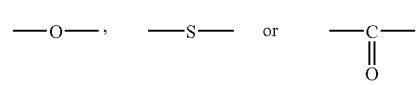

and X is selected among ($C_1$-$C_5$) alkyl radicals and halogens, and p is an integer from 0 to 4;

and radicals of formula:

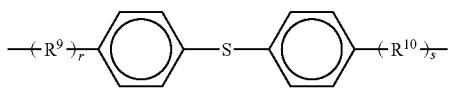

in which $R^9$ and $R^{10}$ are linear or branched ($C_1$-$C_5$) alkyl radicals, optionally having in their chains one or more groups —O—,  —S—  or  $-\underset{\underset{O}{\|}}{C}-$ and r and s are 0 or 1.

Among preferred divalent R radicals, there may be cited radicals:
—(CH$_2$)$_x$— where x is an integer from 2 to 8,
(CH$_2$CH$_2$O)$_y$CH$_2$CH$_2$— radicals where y is an integer from 1 to 4,
(CH$_2$CH$_2$S)$_z$CH$_2$CH$_2$— radicals where z is an integer from 1 to 4,
(CH$_2$)$_{u'}$(S(CH$_2$)$_{v'}$)$_{x'}$S—(CH$_2$)$_{w'}$ radicals where x' is 0 or 1, and u', v', w' are integers from 2 to 6,
radicals of formula:

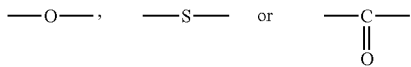

where u and v are integers from 1 to 4,

—CH$_2$CH$_2$—S—CH$_2$—⌬—CH$_2$—S—CH$_2$CH$_2$—,

—CH$_2$—CH—CH—CH$_2$—,  et  $\underset{\underset{SCH_3}{}}{CH_3S}\diagdown C \diagup \underset{\underset{}{}}{SCH_3}$
       |    |
      SCH$_3$ SCH$_3$ Particularly preferred divalent R radicals are:

—H$_4$C$_2$—S—C$_2$H$_4$—

Divalent monomers of formula (I) are disclosed among others in EP-A-273661, EP-A-273710, EP-A-384725.

Among trivalent radicals R of monomers of formula (I), there may be cited ($C_3$-$C_{10}$) alkyltriyl radicals, optionally having in their chains one or more groups —O—,  —S—  or  $-\underset{\underset{O}{\|}}{C}-,$ trivalent alkylaryl radicals with alkyl chains optionally including one or more groups —S— or —O—, and trivalent aryl groups.

Among trivalent R radicals or of higher valency, there may be cited:

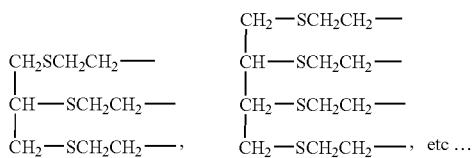

Among the most preferred monomers of formula (I), there may be cited:

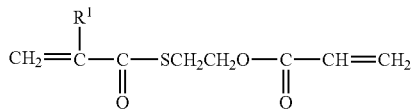

S-2-acryloyloxyethylthio(meth)acrylate,

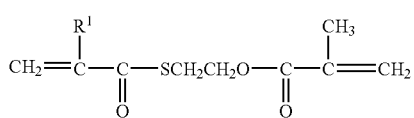

S-2-methacryloyloxyethylthio(meth)acrylate,

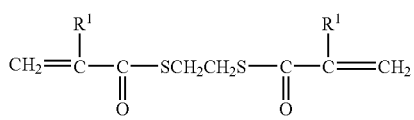

1,2-bis[(meth)acryloylthio]ethane,

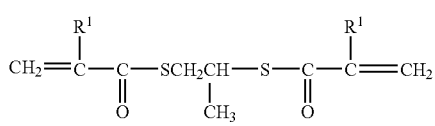

1,2-bis[(meth)acryloylthio]propane,

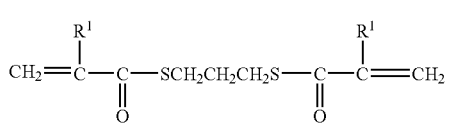

1,3-bis[(meth)acryloylthio]propane,

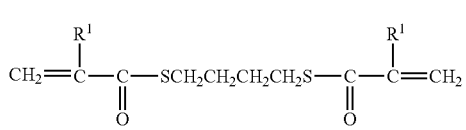

1,4-bis[(meth)acryloylthio]butane,

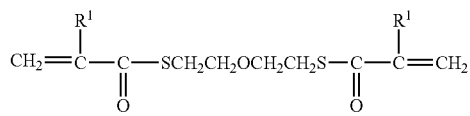

bis-2-[(meth)acryloylthioethyl]ether,

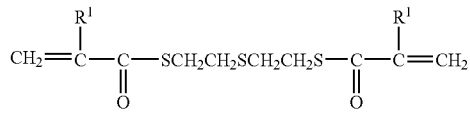

bis-2-[(meth)acryloylthioethyl]sulfide,

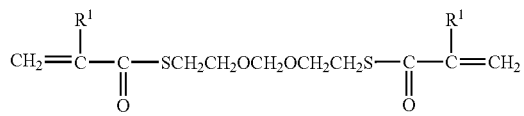

bis-2-[(meth)acryloylthioethoxy]methane,

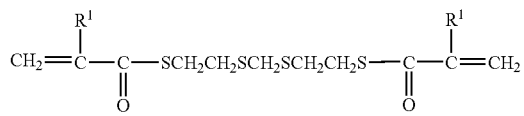

bis-2-[(meth)acryloylthioethylthio]methane,

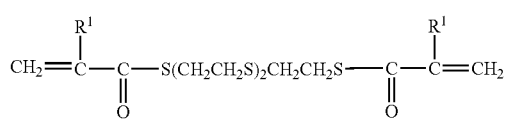

1,2-bis-[2-(meth)acryloylthioethoxy]ethane,

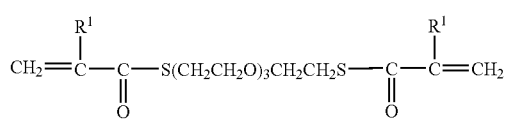

1,2-bis-[2-(meth)acryloylthioethylthio]ethane,

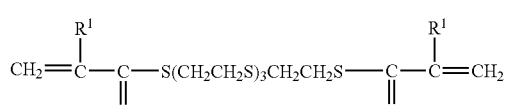

bis-[2-(2-(meth)acryloylthioethoxy)ethyl]ether,

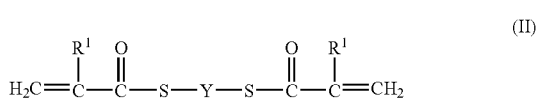

bis-[2-(2-(meth)acryloylthioethylthio)ethyl]sulfide,

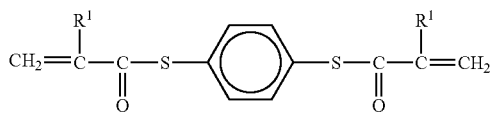

1,4-bis[(meth)acryloylthio]benzene,

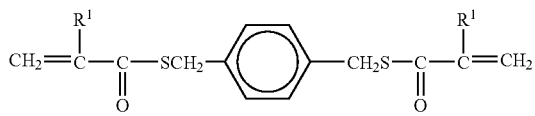

1,4-bis[(meth)acryloylthiomethyl]benzene,

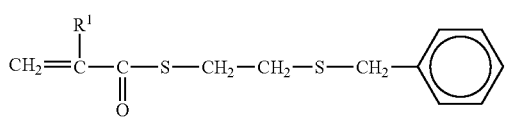

Benzylthioethylthio(meth)acrylate,

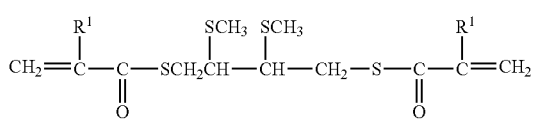

1,4-[bis(meth)acryloylthio]-2,3-dimethylthiobutane,

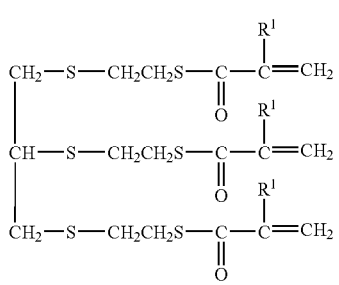

1,2,3-tris[(meth)acryloylthioethyl]thiolpropane, and

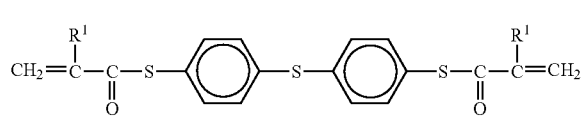

bis[(meth)acryloylthiophenyl]sulfide,
where $R^1$ is H or $CH_3$.

A preferred class of thio(meth)acrylate monomers are monomers of formula:

$$H_2C=\overset{R^1}{\underset{}{C}}-\overset{O}{\underset{}{C}}-S-Y-S-\overset{O}{\underset{}{C}}-\overset{R^1}{\underset{}{C}}=CH_2 \quad (II)$$

in which Y represents a linear or branched ($C_2$-$C_{12}$) alkylene group, a ($C_3$-$C_{12}$) cycloalkylene group, a ($C_6$-$C_{14}$) arylene group or a ($C_7$-$C_{26}$) alkarylene group, the hydrocarbon chains of Y being optionally interrupted by one or more oxygen and/or sulfur atoms, and $R^1$ is H or $CH_3$;

monomers of formula:

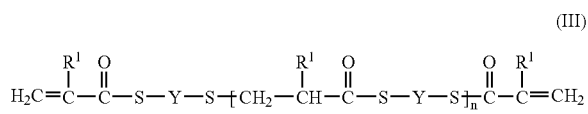
(III)

in which $R^1$ and Y are defined as above and n is an integer from 1 to 6; and mixtures thereof.

A particularly preferred monomer of formula (II) is a monomer of formula:

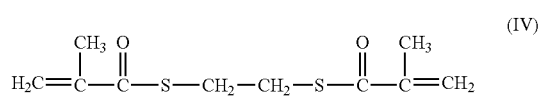
(IV)

A particularly preferred monomer of formula (III) is a monomer of formula:

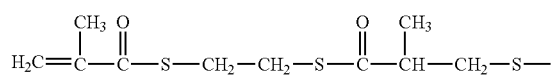
(V)

Monomers of formulas (II) and (III) are disclosed in patent U.S. Pat. No. 5,384,379.

The most preferred thio(meth)acrylate monomers (B) are bis-2-(methacryloylthioethyl)sulfide (BMTES) and bis (methacryloylthiophenyl)sulfide (BMTPS), in particular BMTES.

Preferably, the thio(meth)acrylate monomer of component (B) is a high refractive index thio(meth)acrylate monomer.

In the meaning of the present invention, a high refractive index monomer is a monomer which by homopolymerization results in an homopolymer having a refractive index, $n_D^{25}$ of at least 1.55, preferably 1.6 or more.

Of course, mixtures of thio(meth)acrylate monomers can be used as component (B).

The amount of component (B) present in the photocurable adhesive composition of the invention will range from 5 to 50%, preferably 20 to 50%, more preferably 30 to 50%, and even better 35 to 45% by weight based on the total weight of the photopolymerizable monomers and/or oligomers of the composition.

The third component (C) of the photocurable composition of the present invention consists of at least one aromatic dimethacrylate monomer or oligomer thereof.

Preferred aromatic dimethacrylate monomers are alkoxylated bisphenol-A dimethacrylates, in particular ethoxylated bisphenol-A dimethacrylates.

Preferred monomers (C) are monomers of formula:

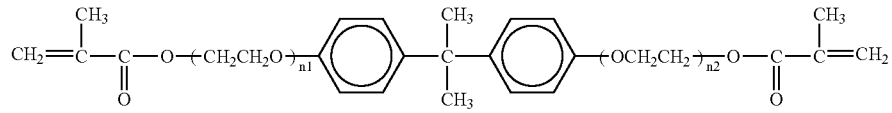

in which $n_1+n_2$ ranges from 2 to 10, preferably from 2 to 6.

Among the preferred ethoxylated bisphenol-A dimethacrylate monomers, there may be cited ethoxylated (2) bisphenol-A dimethacrylate, ethoxylated (4) bisphenol-A dimethacrylate, ethoxylated (8) bisphenol-A dimethacrylate and ethoxylated (10) bisphenol-A dimethacrylate.

Of course, mixtures of aromatic dimethacrylate monomers can be used for component (C).

Component (C) represents 20 to 50%, preferably 20 to 40%, and more preferably 25 to 35% by weight of the total weight of the photopolymerizable monomers and/or oligomers of the composition.

Although not preferred, the composition of the invention may also include monomethacrylate monomers, preferably aromatic monomethacrylate monomers such as benzylmethacrylate.

When present, the monomethacrylate monomers usually represent 10 to 30 wt % of the total weight of the photopolymerizable monomers and/or oligomers.

As the photopolymerization initiator, any widely known compound can be used without limitation that is added for photopolymerizing the polymerizable monomers. Among the photopolymerization initiators that can be suitably used in the present invention, there may be cited benzophenone compounds, acetophenone compounds, α-dicarbonyl compounds, acylphosphine oxide compounds, bisacylphosphine oxide compounds and mixtures thereof.

More specifically speaking, photoinitiator compounds can be represented by the following formula:

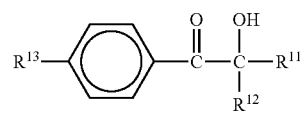

wherein $R^{11}$ and $R^{12}$ are alkyl groups which together may form a cyclohexane ring, and $R^{13}$ is an alkyl group or a hydrogen atom,

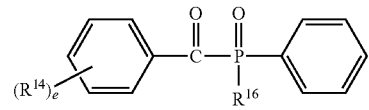

wherein $R^{14}$ is the same or different and is a methyl group, a methoxy group or a chlorine atom, e is 2 or 3, and $R^{15}$ is a phenyl group or methoxy group,

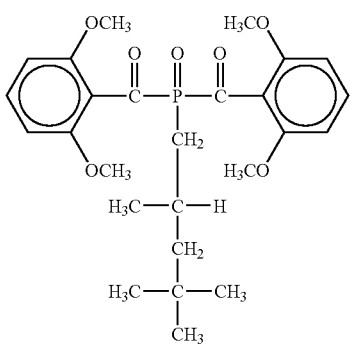

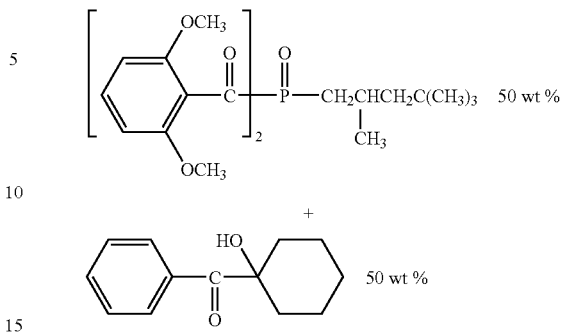

Examples of photopolymerization initiators than can be preferably used in the present invention are as described below:

Acetophenone polymerization initiators:

1) 1-Phenyl-2-hydroxy-2-methylpropane-1-one,
2) 1-Hydroxycyclohexylphenyl ketone, and
3) 1-(4-Isopropylphenyl)-2-hydroxy-2-methylpropane-1-one.

α-Dicarbonyl compounds:

1) 1,2-Diphenylethanedione, and
2) Methylphenylglyoxylate.

Acylphosphine oxide photopolymerization initiators:

1) 2,6-Dimethylbenzoyldiphenylphosphine oxide,
2) 2,4,6-Trimethylbenzoyldiphenylphosphine oxide,
3) Methyl 2,4,6-trimethylbenzoyidiphenylphosphinate ester,
4) 2,6-Dichlorobenzoyldiphenylphosphine oxide, and
5) 2,6-Dimethoxybenzoyldiphenylphosphine oxide.

These photopolymerization initiators can be used in a single kind or in a combination of two or more kinds.

Bisacylphosphine oxide photopolymerization initiators:

1) Bis(2,6-dimethoxybenzoyl)-2,4,4-trimethylpentylphosphine oxide.

Among the preferred photo-initiators are the following photo-initiators:

Irgacure® 500 a 1/1 mixture of benzophenone and 1-hydroxycyclohexylphenyl.

Irgacure® 184

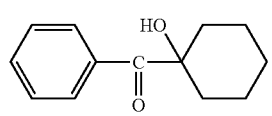

Irgacure® 819

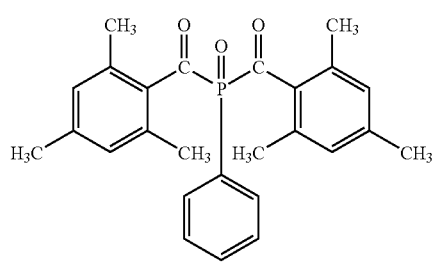

In the present invention, the photo-initiator is added in usual amounts, namely from 0, 1 to 5 parts by weight, preferably 1 to 5 parts by weight based on 100 parts by weight of the photopolymerizable monomer of the composition.

The preferred photocurable adhesive composition of the invention have, after curing, a high refractive index $n_D^{25}$, ranging from 1.52 to 1.65, preferably 1.53 to 1.65, more preferably 1.56 to 1.6, typically about 1.57 and a glass transition temperature Tg of preferably at least 60° C. and more preferably at least 70° C., and even better at least 80° C.

The photocurable adhesive composition is particularly appropriate for use in coating transfer processes, lamination and over molding processes, in particular for making ophthalmic lenses and other optical articles.

Use of the photocurable composition of the invention will now be described as applied to a coating transfer process for making coated substrates such as ophthalmic lenses. It shall be understood that the photocurable adhesive composition of the invention may be used in any coating transfer method and not solely in the process described below.

The substrate is preferably a lens blank. Preferably, the main surface of the blank onto which the coating is transferred, is a geometrically defined surface.

By geometrically defined surface of the lens blank or of a mold part, there is meant either an optical surface, that is a surface of required geometry and smoothness or a surface having a required geometry but that may still exhibit some roughness, such as a lens blank that has been grinded and fined, but not polished to the required geometry. The surface roughness typically ranges from Sq $10^{-3}$ µm to 1 µm, preferably from $10^{-3}$ to 0.5 µm and most preferably from $10^{-3}$ to 0.1 µm.

Sq: Quadratic mean of the deviations from the mean $$Sq = \sqrt{\frac{1}{NM}\sum_{x=1}^{N}\sum_{y=1}^{M} Zx, y^2}$$

Computes the efficient value for the amplitudes of the surfaces (RMS). This parameter is included in the EUR 15178 EN report (Commission of the European Communities) Stout et al. 1993: The development of methods for the characterisation of roughness in three dimensions.

The roughness (Sq) was measured by P-10 Long Scan of KLA-Tencor.

The measurement condition was under 2 µm tip 1 mg force 10 scans 500 µm long 2000 data points.

By optical surface, there is meant a surface of the lens blank or of a mold part that has been ground, fined and polished or molded to required geometry and smoothness.

An important feature of the process of the present invention is that the transfer of the coating onto the geometrically defined surface of the lens blank is performed without any substantial compression of the blank and thus without any risk of deformation of the blank geometry and in particular of the geometrically defined surfaces thereof.

Nevertheless, the pressure exerted on the external surface of the support is preferably substantially maintained at least up to the gelling of the adhesive composition. Maintaining the pressure can be effected through the use of an inflatable membrane placed on the external surface of the support.

Preferably, the applied pressure ranges from 5 to 50 Psi (0.35 to 3.5 $kgf/cm^2$), and more specifically 0.3 to 3 $kgf/cm^2$.

Most preferred range is 5 to 20 Psi (0.35 to 1.40 $kgf/cm^2$).

Using the above described process, coatings may be transferred successively or simultaneously to both front and rear geometrically defined surfaces of the lens blank. The transfer of the coatings may also be performed only to one side of the lens blank, preferably to the back side (or rear side).

The coating support or carrier may simply be a thin supporting film made of an appropriate material such as a plastic material, for example a polycarbonate film. The coating support is preferably a mold part made of any appropriate material, preferably made of a plastic material especially a thermoplastic material and in particular of polycarbonate.

It is also possible to use a coating support or carrier on the surface of which the adhesive has already been applied and possibly gelled. In that case, a film may be used to cover and protect the surface of the adhesive. The protective film is removed before using the carrier.

The working surface of the mold part may have a relief organized according to a pattern, in other words, may be microstructured and may confer to the final lens an optical surface having the properties imparted by the microstructure (for example antireflective properties).

Different techniques for obtaining a microstructured mold part are disclosed in WO99/29494.

The mold part or carrier may be obtained by using known processes such as surfacing, thermoforming, vacuum thermoforming, thermoforming/compression, injection molding, injection/compression molding.

The support, typically a mold part, may be rigid or flexible, but is preferably flexible. Using rigid mold parts necessitates to have a large number of mold parts each comprising a geometrically defined surface whose geometry is adapted to a specific geometry of the geometrically defined surface of a lens blank. In order to avoid the necessity of having such a huge number of different mold parts, the mold part is preferably a flexible mold part, in particular a flexible mold part made of a plastic material such as polycarbonate. When using this flexible mold part it is only necessary to provide the mold part with a surface the geometry of which conforms to the general shape of the optical surface of the lens blanks onto which the coating is to be transferred, either a concave or convex shape, but it is not necessary that this surface strictly corresponds to the geometry of the lens blank surface to be coated. Thus, the same mold part can be used for transferring coatings onto lens blanks having surfaces of different specific geometries. Generally, the flexible mold part has two parallel main surfaces and consequently has an even thickness.

The coating bearing surface of the flexible mold is preferably spherical.

Flexible mold parts would typically have a thickness of 0.2 to 5 mm, preferably of 0.3 to 5 mm. More preferably, the flexible mold part is made of polycarbonate, and in this case the thickness is from 0.5 to 1 mm.

It has been found that the best embodiments of the transfer process are achieved if specific requirements regarding the base curvatures of the mold part and lens blank are fulfilled.

In this patent application, when one refers to the base curvature of the mold part, one means the base curvature of the working surface of the mold part, that is to say the surface which bears the coatings to be transferred to the lens or lens blank.

In the same way, base curvature of the lens or lens blank means the base curvature of the surface to which the coatings are going to be transferred from the above cited mold part.

In this application, the base curvature has the following definition:

For a spheric surface, having a radius of curvature R,

Base curvature (or base)=530/$R$($R$ in mm);

such kind of definition is quite classical in the art

For a toric surface, there are two radii of curvature and one calculates, according to the above formula, two base curvatures BR, Br with BR<Br.

For a coating transfer to a spherical back side of a lens or lens blank, in order to avoid distortions, in particular when using a flexible mold part, the base curvature (BC) of the flexible mold part (front side) must be slightly higher than the base curvature (BL) of the geometrically defined surface of the lens or the lens blank on which the coating is to be transferred. However, BC shall not be too high in order to avoid cracking of the coating during the transfer process or an optical power outside tolerance of the Optical Laboratory Standard Z80.1 after the transfer.

Typically, for a spheric lens or lens blank, base curvature BL of the lens or lens blank and base curvature BC of the flexible mold part shall satisfy the relationship:

0<$BC-BL$<1.5

Preferably 0.2<$BC-BL$<1

For a coating transfer to a toric back side of a lens or a lens blank (cylindric lens or lens blank), having two principal meridians, of radii R and r with R>r, it is possible to calculate two base curvatures BLR and BLr corresponding respectively to radii R and r defining the toric surface.

Base curvatures of the lens BLR and BLr and the base curvature of the flexible mold part shall satisfy the following relationship:

BLR<BLr a) if BLr−BLR≦3.5
   0<BC−BLR<3}
      |BC−BLr|<1}
preferably
   0.2<BC−BLR<2.5}
      |BC−BLr|<0.5}
b) if BLr−BLR>3.5
   BLR<BC<BLr When using a rigid mould part, preferably the base curvature of the mould part (BC) is the same as the base curvature of the lens or lens blank (BL).

Preferably, when moving relatively to each other the mold part and the blank, the contact between coating(s) and curable adhesive composition or between adhesive composition and lens blank geometrically defined surface occurs respectively in the center area of the coated mold part or in the center area of the lens blank geometrically defined surface.

In particular in the case of a flexible mold part, the convex front face of the mold part may have a shorter radius of curvature than the concave surface of the blank to be coated. Thus, pressure is applied at the center and the mold part is then deformed to conform to the blank surface. The glue layer is formed starting from the center of the blank, which avoids entrapping air bubbles within the final cured adhesive composition layer. The same will be true using the concave surface of a mold part of longer radius of curvature than a convex blank surface to be coated.

As previously mentioned, transfer from a flexible mold part may be effected using an inflatable membrane.

The inflatable membrane can be made of any elastomeric material which can be sufficiently deformed by pressurization with appropriate fluid for urging the flexible mold part against the lens or lens blank in conformity with the surface geometry of the lens or the lens blank.

The inflatable membrane can be made of any appropriate elastomeric material. Typically, the inflatable membrane has a thickness ranging from 0.50 mm to 5.0 mm and an elongation of 100 to 800%, and a durometer 10 to 100 Shore A.

For UV curing, then a transparent material shall be selected, for example a transparent silicone rubber or other transparent rubbers or latexes: the UV light is preferably irradiated from the mold side.

The pressure applied to the mold part by the inflatable membrane will preferably range from 30 kPa to 150 kPa and will depend on the lens or lens blank and flexible mold part sizes and curvatures. Of course, the pressure needs to be maintained onto the flexible mold part and the lens or lens blank until the glue or adhesive is sufficiently cured so that enough adhesion of the coating to the lens or lens blank is obtained.

The lens blank can be a lens having one or both of its faces surfaced or casted to the required geometry. (A lens having only one of its faces surfaced or casted to the required geometry is called a semi-finished lens).

Preferably, the lens blank has a first face conferring progressive power and a second face conferring non-progressive power, but of spherical or torical shape onto which coating transfer according to the invention process is preferably performed. Preferably, the progressive face is the front face of the blank.

The lens blank can also be a semi-finished lens wherein one face of the lens, preferably the front face of the lens has previously been treated with an appropriate coating (anti-reflective, hard coat, etc. . . . ) and the remaining face, preferably the rear face, of the lens is coated using the transfer process of the invention. The lens blank can be a polarized lens.

Although the following description makes reference to the use of a preferred flexible mold part, it shall be understood that the described process can also be implemented using rigid mold parts.

Figure 1B:
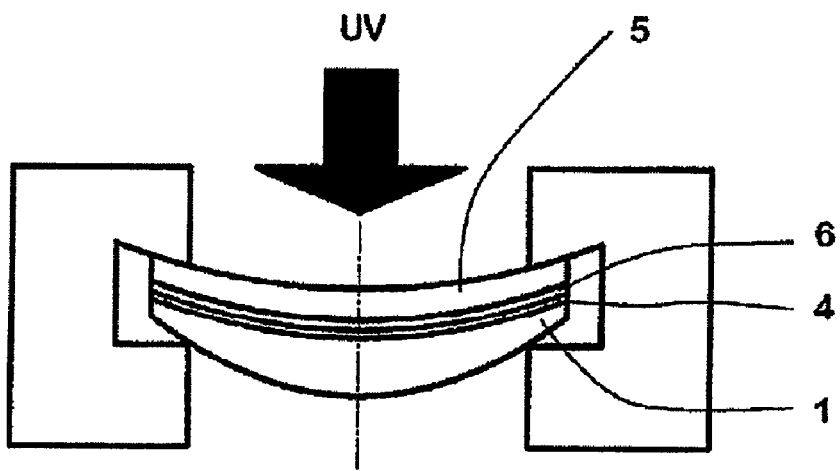
Figure 1C:
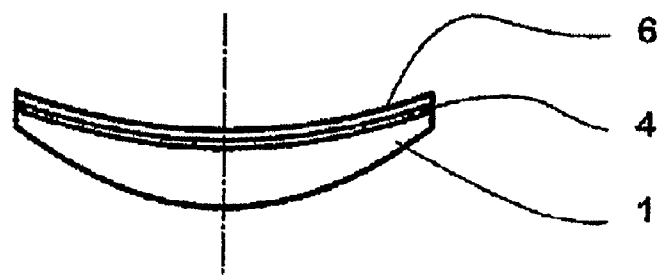

Referring now to the drawings and in particular to FIGS. 1A to 1C, a lens blank 1 having a concave surface 2 is placed on a supporting element 3 with its concave surface 2 facing upwardly. A pre-measured drop of a UV curable adhesive composition 4 according to the invention is then deposited onto the surface 2 of the lens blank 1. A flexible mould part 5 having a convex optical surface, which has been previously coated with a prescribed coating 6, is placed onto a supporting element 7 with its surface bearing the optical coating facing downwardly.

Deposition of coating 6 on the surface of the flexible mold part 5 can be done through any usual deposition process employed in the optical field, such as vacuum deposition, spin coating, brush coating, dip coating etc. . . . . Of course, the deposition process will depend on the nature of the coating layer or layers deposited on the surface of the flexible mold part 5.

Thereafter the supporting elements 3, 7 are moved relatively to each other to bring into contact coating 6 and UV curable adhesive composition drop 4 and a pressure is exerted to the external surface of the mold part opposite to the coating in such a manner that the UV curable adhesive composition drop will spread on the surface 2 of the lens blank 1 and on the coating 6. However, the exerted pressure shall only be sufficient for spreading the drop of adhesive composition in order to obtain the required thickness for the final cured film (generally 100 µm or less) but insufficient to impart any deformation to the lens blank 1.

As shown in FIG. 1B, the assembly formed by the lens blank 1, the adhesive composition film 4, the coating 6 and the mold part 5 is then placed into a device for UV curing the adhesive composition film 4. After UV curing of the film 4, the mold part 5 is withdrawn and a blank 1 having a coating 6 adhered onto its concave surface 2 is recovered as shown in FIG. 1C.

Figure 2A:
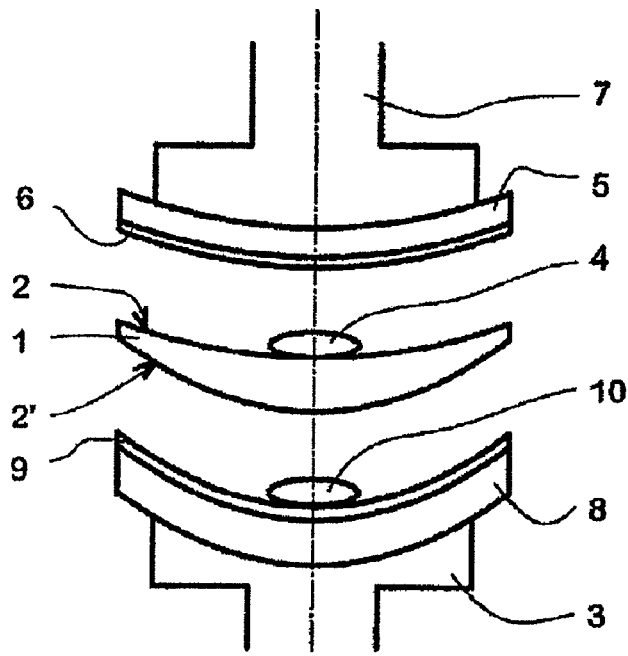
FIGS. 2A to 2C are schematic views of the main steps of a second embodiment of the process of the invention wherein coatings are simultaneously transferred to both optical surfaces of a lens blank.
Figure 2B:
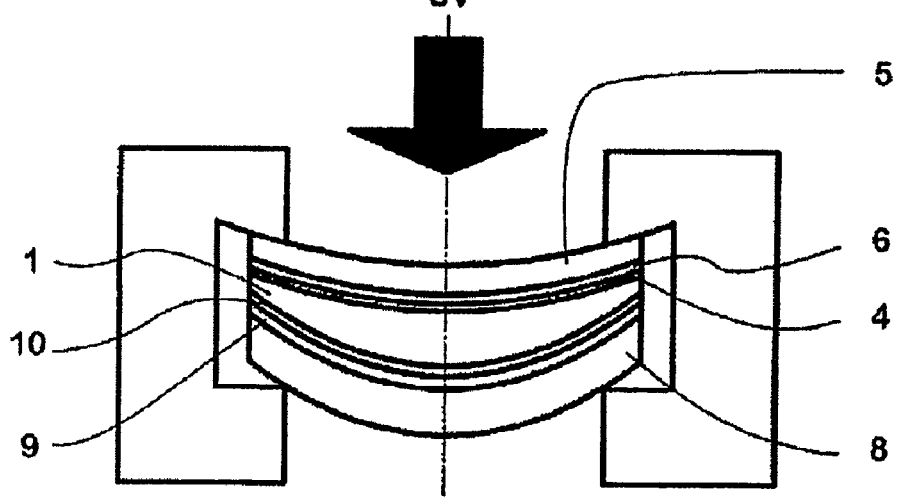
Figure 2C:
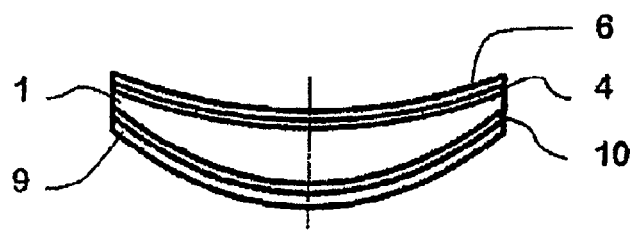

Referring now to FIGS. 2A to 2C, there is shown a similar process as described in connection with FIGS. 1A to 1B but in which both surfaces of lens blank 1 are coated with a coating by the transfer method of the invention.

As shown in FIG. 2A, a flexible mould part 8, for example a mould part made of polycarbonate having a thickness of 1 mm, whose concave surface has been previously coated with an optical coating 9 is placed onto a supporting element 3. A pre-measured drop 10 of a UV curable adhesive composition is then deposited onto coating 9. A lens blank 1 is then placed on mold part 8 with its convex surface 2' in contact with glue drop 10. A pre-measured UV curable adhesive composition drop is then deposited on concave surface 2 of lens blank 1. A flexible mold part 5, for example a polycarbonate mold part of 1 mm thickness, whose convex surface has been previously coated with an optical coating 6 is placed on a supporting element 7. Supporting elements 3, 7 are then moved relatively to each other to bring coating 6 into contact with adhesive composition drop 4 and a pressure is exerted on at least the external surface of one of the mold part to spread the adhesive composition drops 4 and 10 to form films. As indicated previously, the pressure exerted must only be sufficient to spread the adhesive composition drops and form films of required thicknesses after curing but insufficient to create any deformation in the lens blank 1.

Thereafter, the assembly formed by the mold parts, optical coatings, adhesive composition films and lens blank is placed into a UV curing device where the adhesive composition films 4, 10 are UV cured.

After completion of curing of the adhesive composition films, mold parts 5 and 8 are withdrawn and a finished lens having optical coatings 5, 6 adhered to both surfaces of the lens blank 1 is recovered, as shown in FIG. 2C.

Figure 3A:
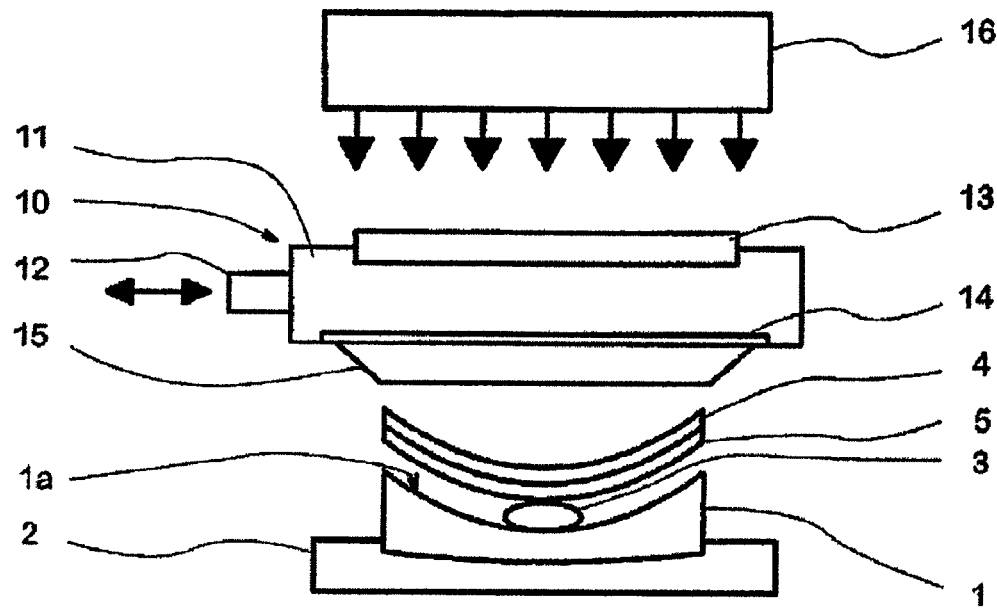
FIGS. 3A and 3B are schematic views of the main steps of a third embodiment of the process of the invention using an inflatable membrane apparatus.
Figure 3B:
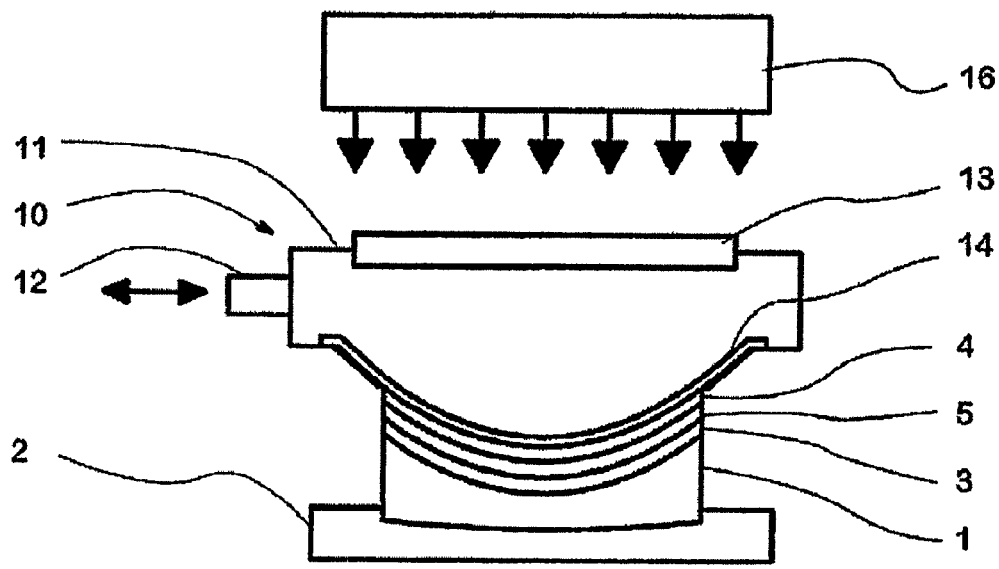

FIGS. 3A and 3B are schematic views of a third embodiment of the process of the invention in which the transfer of the coating is performed using a flexible mold part or carrier which is urged against the lens blank surface using an inflatable membrane.

FIG. 3A shows the lens blank, flexible carrier and inflatable membrane before pressurization and inflation of the membrane, whereas FIG. 3B shows the same after pressurization and inflatation of the membrane.

Referring to FIG. 3A, a lens blank 1, for example a tonic lens blank is placed in a lens blank support with its geometrically defined surface 1a facing outwardly.

A drop of photocurable adhesive composition 3 is deposited at the center of the geometrically defined surface 1a of the lens blank 1.

A thin flexible carrier 4, for example a spheric carrier, having a transferable coating 5 deposited on one of its faces, is placed on the adhesive composition drop 3 so that the transferable coating 5 is in contact with the adhesive drop 3. The base curvature of the flexible carrier 4 is slightly higher than the base curvature of the geometrically defined surface 1a of a lens blank 1.

The whole assembly is place in front of an inflatable membrane apparatus 10.

The inflatable membrane apparatus 10 comprises a fluid accumulator 11, for example an air accumulator provided with fluid port 12, for example an air port connected to a pressurized fluid source (not represented) for introducing pressurized fluid within the accumulator and also evacuating pressurized fluid form the accumulator the upper face of the accumulator 10 comprises a light transparent portion 13, for example a UV transparent quartz glass portion, whereas the lower face of the accumulator 10 comprises a transparent inflatable membrane 14 in register with the transparent quartz glass 13.

As shown in FIG. 3A, the apparatus 10 further comprises a guiding means 15 for laterally guiding the inflatable membrane 14 during inflation thereof. More specifically, this guiding means comprises a trunconical part or funnel 15 projecting outwardly form the lower face of the accumulator 10 and whose greater base is obturated by the inflatable membrane and whose smaller base is a circular opening having a diameter at least equal to the base diameter of the flexible carrier 4 but preferably slightly larger (up to 5 mm larger . . . ).

Typically, the funnel height will range from 10 to 50 mm, preferably 10 to 25 mm, and will have a taper of 10 to 90°, preferably 30 to 50°.

Finally, a light source, for example a UV light source 16 is placed behind the accumulator 10 in front of the transparent quartz plate 13.

Generally, the assembly comprising the lens blank holder 2, the lens blank 1, the adhesive composition drop 3 and the flexible carrier 4 is placed so that the rim of the flexible carrier 4 be within the plan of the rim of the smaller base opening of funnel 15 or separated therefrom by a distance up to 50 mm, preferably up to 20 mm.

As shown in FIG. 3B, a pressurized fluid, such as pressurized air, is introduced into the accumulator 11 from an external source (not represented) through entrance 12. The pressure increase within the accumulator, inflates the inflatable membrane 14 uniformly urges the flexible carrier against the lens blank 1, while uniformly spreading the adhesive 3.

The adhesive composition is then UV-cured.

After completion of the curing step, the lens blank 1 is disassembled from the holder 2 and the flexible carrier 4 is removed to recover a lens blank 1 whose geometrically defined surface 1a bears the transferred coating 5.

Using the funnel type of apparatus just described, a good coating transfer is obtained, with good optical quality meeting the America Optical laboratory Standard (ANSI Z80.1-1987) as far as the power, cylinder, prism and distortion are concerned.

The membrane guiding means (funnel) is very important to let the membrane expand in good shape and direction for applying an even pressure on the flexible carrier through the lens blank without any extra pressure on the carrier and lens blank edges.

As previously mentioned, the thickness of the final adhesive composition layer after curing is less than 100 μm preferably less than 80 μm, most preferably less than 50 μm and usually 1 to 30 μm.

The substrates which are highly preferred for the process of the invention are made of any thermoplastic material, in particular, suitable for making optical lenses such as polycarbonate.

However, even if they are not preferred, substrates made of thermosetting (cross linked) materials such as diethyleneglycol bis allylcarbonate polymer (CR39®PPG), polyurethane, polythiourethane, episulfide high index material can be used.

The substrate may optionally contain photochromic compounds.

Preferably, the substrate has a very high refractive index, i.e. a refractive index, $n_D^{25}$, of 1.56 or more, typically from 1.56 to 1.74 and preferably from 1.57 to 1.59.

A preferred substrate material is polycarbonate (PC).

The transferred coating may comprise any coating layer or stack of coating layers classically used in the optical field, such as a hydrophobic top coat, an anti-reflective coating layer, an anti-abrasion coating layer, an impact resistant coating layer, a polarized coating layer, a photochromic coating layer, an optical-electronical coating, an electric-photochromic coating, a dying coating layer, a printed layer such as a logo or a stack of two or more of these coating layers.

According to a preferred embodiment of the invention, it is transferred to the geometrically defined surface of the lens blank a stack comprising:

- optionally, a hydrophobic top coat;
- an antireflective stack, generally comprising inorganic material such as metal oxide or silica;
- an anti abrasion (hard) coat, preferably comprising a hydrolyzate of one or more epoxysilane (s) and optionally one ore more inorganic filler(s) such as colloidal silica;
- optionally, an impact resistant primer, preferably a polyurethane latex or an acrylic latex;
- each of the layers of the stack being deposited onto the support in the above recited order.

The method of the invention is particularly interesting for transferring the whole stack comprising "top coat, antireflective coat, hard coat and primer coat".

Generally the thickness of the antireflective coat or stack ranges from 80 nm to 800 nm and preferably 100 nm to 500 nm.

The thickness of the hard coat preferably ranges from 1 to 10 micrometers, preferably from 2 to 6 micrometers. The thickness of the primer coat preferably ranges from 0.5 to 3 micrometers.

Typically, the total thickness of the coating to be transferred is 1 to 500 μm, but is preferably less than 50 μm, more preferably less than 20 micrometers, or even better 10 μm or less.

The following examples illustrate the present invention.

In the examples multilayer coatings deposited on a 6.1 base back curve, 0.5 mm thick PC carrier were transferred onto the surface and polished, untreated back surfaces of polycarbonate lenses (−2.00 D, 5.1 base back curve) using the above described coating transfer process and a flexible membrane apparatus.

Multilayer Coating

In all the examples, the multilayer coating comprises hydrophobic top coat/anti-reflective coating/hard coating/primer coating (HMC).

STEP 1: Protecting and Releasing Coating

The composition of the protecting and releasing coating was as follows:

| Component | Parts by weight |
| --- | --- |
| PETA LQ (acrylic ester of pentaerythritol) | 5.00 |
| Dowanol PnP | 5.00 |
| Dowanol PM | 5.00 |
| n-propanol | 5.00 |
| 1360 (Silicone Hexa-acrylate, Radcure) | 0.10 |
| Coat-O-Sil 3503 (reactive flow additive) | 0.06 |
| Photoinitiator | 0.20 |

The PC carrier is cleaned using soapy water and dried with compressed air. The carrier convex surface is then coated with the above protecting coating composition via spin coating with application speed of 600 rpm for 3 seconds and dry speed of 1200 rpm for 6 seconds. The coating is cured using Fusion System H+ bulb at a rate of 1.524 m/minute (5 feet per minute).

STEP 2: Hydrophobic Top Coat and Anti-Reflective (AR) Coating

The PC carrier after deposition of the protecting coating is vacuum coated as follows:

A/ Standard Vacuum AR Treatment: The Vacuum AR treatment is accomplished in a standard box coater using well known vacuum evaporation practices. The following is one procedure for obtaining the VAR on the mold:

1. The carrier having the protective coating already applied on the surface, is loaded into a standard box coater and the chamber is pumped to a high vacuum level.
2. 
3. Hydrophobic coating (Chemical=Shin Etsu KP801M) is deposited onto the surface of the carrier using a thermal evaporation technique, to a thickness in the range of 2-15 nm.
4. The dielectric multilayer AR coating, consisting of a stack of sublayers of high and low refractive index materials is then deposited, in reverse of the normal order. Details of this deposition are as such:

The optical thicknesses of the alternating low and high refractive index layers are presented in the table (They are deposited in the indicated order, from the mold surface):

| | |
| --- | --- |
| Low index | 103-162 nm |
| High index | 124-190 nm |
| Low index | 19-37 nm |
| High index | 37-74 nm |

A preferred stack is a stack wherein the low index material is $SiO_2$ and the high index material is $ZrO_2$.

B/ At the completion of the deposition of the four-layer anti-reflection stack, a thin layer of $SiO_2$, comprising of a physical thickness of 1-50 nm, is deposited. This layer is to promote adhesion between the oxide anti-reflection stack and a lacquer hard-coating which will be deposited on the coated mold at a later time.

STEP 3: Hard Coat (HC) & Latex Primer Coating

The composition of the hard coating is as follows:

| Component | Parts by weight |
| --- | --- |
| Glymo | 21.42 |
| 0.1N HCl | 4.89 |
| Colloidal silica | 30.50 |
| Methanol | 29.90 |
| Diacetone alcohol | 3.24 |
| Aluminium acetylacetonate | 0.45 |
| Coupling agent | 9.00 |
| Surfactant FC-430 (3M company) | 0.60 |

The composition of the primer is as follows:

| Component | Parts by weight |
| --- | --- |
| Polyurethane latex W-234 | 35.0 |
| Deionized water | 50.0 |
| 2-Butoxy ethanol | 15.0 |
| Coupling agent | 5.00 |

The PC carrier after deposition of protecting coating and AR coating in Steps 1 and 2 is then spin coated by HC solution at 600 rpm/1200 rpm, and precured 10 minutes at 80° C., and again spin coated by latex primer solution at the same speed and postcured for 1 hour at 80° C.

The coupling agent is a precondensed solution of:

| Component | Parts by weight |
| --- | --- |
| GLYMO (Glycidoxypropyltrimethoxysilane) | 10 |
| Acryloxypropyltrimethoxysilane | 10 |
| 0.1 N HCl | 0.5 |
| Aluminum acetylacetonate | 0.5 |
| Diacetone alcohol | 1.0 |

Transfer Parameters photocurable adhesive composition:

a few drops (0.5-0.7 g) are placed in center of lens, or one drop in center and four equidistant from center.

membrane pressure (pressure applied by the membrane on the mold)

10 or 12 psi (0.689 or 0.827 bar)

UV irradiation

Dymax 2000-EC flood UV light with bulb part no. 35008, intensity 135 mW/cm$^2$.

Exposure time:

40 seconds, after obtaining membrane set point.

After the transfer process, the lenses were edged to 65 mm diameter to allow carrier removal, then hand washed with soapy water, rinsed with tap water and then deionized water, air dried and inspected.

Testing and Inspection Procedures

Adhesion is measured using the cross-hatch adhesion test according to ISTM 02010, using 3M SCOTCH® no. 600 transparent tape.

25 squares are formed.

Adhesion is rated as follows:

| Adhesion score | Squares removed | Area % left intact |
|---|---|---|
| 0 | 0 | 100 |
| 1 | <1 | 96 |
| 2 | 1 to 4 | 96–84 |
| 3 | >4 to 9 | 83–64 |
| 4 | >9 to 16 | 63–36 |
| 5 | >16 | <36 |

Resistance to thermal cracking is determined by the measure of the critical temperature (Tc) according to ISTM method no. 02032.

The critical temperature Tc of an anti-reflective treated lens is that temperature at which crazing (fine cracking) of the anti-reflective treatment is first noted by visual inspection. Lenses are placed in a temperature controlled oven (50° C. to start) for one hour, then removed and quickly examined for crazing. If no crazing is noted, the lenses are then placed in an oven, 10° C. higher in temperature than the previous oven. The process is repeated until crazing is noted, or the lens survives 100° C.

If crazing is found on a lens immediately after removal from the oven, but is not visible 24 hours later (kept at room temperature), the reported critical temperature is modified with a "+" suffix.

A coated lens is considered as resistant to thermal cracking if Tc>60° C., preferably Tc≧65° C. However, a coated lens having a Tc≧50° C. is considered acceptable.

Haze and application stain levels were visually determined using a standard R17 application lamp with Vita-Life 15 Watt fluorescent bulb and then a mini-spot 41601 lamp manufactured by OSRAM.

The lenses were viewed with the incident light approximately normal to the lens surface. Haze is defined as a general cloudiness or diffusion of the light over a large area of the lens. The inspection is made visually.

The mini-spot lamp is more accurate than the lamp with the Vita-Life bulb.

Comparative Examples C1 TO C10

Several mono and difunctional acrylate and methacrylate monomers were individually used as photocurable adhesive compositions. All compositions also contain 0.2% by weight of Irgacure® 500 as photoinitiator.

The resulting coated lenses were tested for adhesion and haze level.

The monomers used and results are given in table 1.

TABLE 1

| Example | Monomer | Adhesion | Haze |
|---|---|---|---|
| C1 | Isobornyl acrylate (SR 423A) | Did not completely cure | N/A |
| C2 | THF-acrylate (SR 285) | 0 | YES |
| C3 | 1,6-hexanediol diacrylate (SR 238) | 0 | YES |
| C4 | Diethyleneglycol diacrylate (SR 230) | 0 | YES |
| C5 | Tetraethyleneglycol dimethacrylate (SR 209) | 5 | YES |
| C6 | Adhesion promoting triacrylate (SR 9012) | 5 | NO |
| C7 | 4EO bisphenol-A dimethacrylate (CD 540) | 4 | NO |

TABLE 1-continued

| Example | Monomer | Adhesion | Haze |
|---|---|---|---|
| C8 | 8EO bisphenol-A dimethacrylate (CD 542) | 5 | NO |
| C9 | 10EO bisphenol-A dimethacrylate (SR 480) | 5 | NO |
| C10 | Bis(methacryloylthioethyl)sulfide (BMTES) | 5 | NO |

Initiator: Irgacure 500 (2 wt %) (by weight of monomer composition). SR 9012 is a trifunctional acrylate ester/unsaturated cyclic dione.

Table 1 shows that if most acrylate homopolymers result in good adhesion of the coating to the lens they lead to non acceptable haze. On the contrary, the ethoxylated aromatic methacrylate and thiomethacrylate homopolymers result in no haze but fail regarding the adhesion requirement.

Examples 1 to 3

Ternary blends according to the invention are used as photocurable adhesive compositions. Formulations as well as test results are given in Table 2.

TABLE 2

| | EXAMPLE | | |
|---|---|---|---|
| Monomer (% by weight) | 1 | 2 | 3 |
| Formulation | | | |
| BMTES | 40 | 40 | 40 |
| Diethyleneglycol diacrylate | 30 | 30 | 30 |
| 2EO bisphenol-A-dimethacrylate | 30 | — | — |
| 4EO bisphenol-A-dimethacrylate | — | 30 | — |
| 8EO bisphenol-A-dimethacrylate | — | — | 30 |
| Photoinitiator Irgacure ® 819 (% wt) (1) | 3 | 3 | 3 |
| Properties | | | |
| Adhesion | 0 | 0 | 0 |
| Haze | NO | NO | NO |
| Application stain | NO | NO | NO |
| $T_c$(° c.) | 60–70 | 70–80 | 60–70 |

(1): % by weight of the monomer (total weight of monomer).

Results in Table 2 show that ternary compositions according to the invention fulfil all requirements regarding adhesion, haze, application stain and critical temperature.

Several commercially available photocurable adhesive compositions are used for coating transfer and tested as above.

Compositions and results are given in Table 3.

TABLE 3

| Company | Product | Cure Comments | X-htch Adhesion | Haze | Application stain | Tc (° c.) |
|---|---|---|---|---|---|---|
| Dymax Corporation | OP-4-20628 | CST | 0 | YES | YES | NT |
| | OP-42B | IST/EC | 4–5 | NO | 0 | NT |
| | X-301-44-2 | EC | 1 | NO | 0 | NT |
| | X-415-102-A | IST/EC | 5 | n/a | n/a | NT |
| | X-410-96-1 | IST/EC | 0 | NO | 0 | 50 |
| | OP-4-20632 | NO TRANSFER | 5 | n/a | n/a | NT |
| | OP-40 #54194 | CST | 5 | n/a | n/a | NT |
| | 3-20256 #72521 | CST | 0 | YES | yes | NT |
| | X-372-45-1 #00327 | CST | 0 | NO | ? | 50 |
| | X-372-45-1 #03191 | CST | 0 | NO | no? | 50 |
| | 1128M # 28542-26083 | CST | 5 | YES | yes | NT |
| | 1181-M #28542-27047 | IST | 0 | YES | yes | NT |
| | 1186-M #28542-27887 | EC | 5 | YES | 0 | NT |
| | 1191-M #28542-23578 | EC | 0 | NO | 0 | NT |
| | 1-20560 #28542-25319 | EC | 0 | YES | 0 | NT |
| | OP-54 | NO TRANSFER | 5 | n/a | n/a | NT |
| | OP-30 | EC | 1–2 | YES | 0 | NT |
| | OP-61-LS | CURED OPAQUE | n/a | n/a | n/a | NT |
| | OP-21 | EC+ | 0 | NO | 0 | NT |
| | OP-29V | EC+ | 5 | n/a | n/a | NT |
| | OP-29V | EC+ | 1–2 | NO | 0 | NT |
| Norland Optical Adhesives | NOA 61 | IST/EC | 5 | n/a | n/a | NT |
| | NOA 65 | IST/EC | 5 | n/a | n/a | NT |
| | NOA 68 | IST/EC | 5 | n/a | n/a | NT |
| | NOA 81 | IST/EC | 5 | n/a | n/a | NT |
| | NOA 83H | e.c. | 5 | n/a | n/a | NT |
| Loctite | 3104-23694 | CST | 0 | YES | yes | NT |
| | 3105-23695 | CST | 0 | NO | 0 | 50 |
| | 3494 | IST | 0 | NO | 0 | 50 |
| | FT-01616 (X-245622) | IST | 0 | NO | 0 | 50 |
| Epoxy Technology, INC. | EPO-TEK OG144 | CST | 5 | n/a | n/a | NT |
| | EPO-TEK OG142-13 | IST/EC | 5 | n/a | n/a | NT |
| Summers Optical | Type SK-9 Lens Bond | CST | 5 | n/a | n/a | NT |
| | Type J-91 Lens Bond | IST | 5 | n/a | n/a | NT |
| S.C. Radco | 222A | CST | 5 | n/a | n/a | NT |
| Cyberlife | 4436 | CST/EC | 2–3 | NO | 0 | NT |

NT=not tested due to earlier failure
Cure Comments Abbreviations
CST Complete stack transfer
IST Incomplete stack transfer
EC Edge cracks during BST process
EC+ Extensive edge cracking
n/a non applicable Table 3 shows that almost none of the commercially available adhesives lead to final coated lenses having the whole set of required properties.

Example of Calculation of the Solubility Parameters.

The following example will show, step by step, how the solubility parameter for neopentylglycol diacrylate was calculated. The solubility parameter calculation is based on the technique of group contribution, which assumes that each functional group in a molecule contributes additively to a thermodynamic property. Hoy's group contribution values are derived from vapor pressure measurements.

The energy of vaporization is given by:

$$\Delta E^v = \Sigma_j n_j \Delta e_j$$

where $n_j$ is the number of groups of type j in the molecule, and $\Delta e_j$ is the energy of vaporization contribution for group j.

Hoy's (and others) group contribution values are reported as molar attraction constants (F), which are related to the energy of vaporization in the following way:

$$F_j = \sqrt{\Delta E^v_{i,j} V_{i,j}}$$

where $V_i$ is the molar volume of the molecule.

The solubility parameter (δ) for a molecule is related to the molar attraction constants in the following way:

$$\delta_j = \sqrt{\frac{\Delta E^v_i V_i}{V_i^2}} = \frac{\Sigma_j F_j}{V_i} = \frac{\rho_{ij} \Sigma_j F_j}{M_i}$$

where $\rho_{ij}$ is the density of the molecule, and $M_i$ is the molecular weight.

Step 1

The molecule is deconstructed into the different functional groups which are listed by Hoy. FIG. 1 shows a ball-and-stick drawing of neopentylglycol diacrylate. The different functional groups have been numbered, with multiple occurances of the same functional group being given the same number.

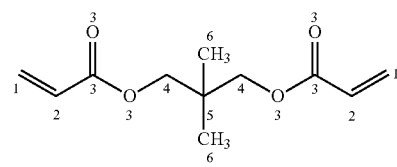

FIG. 1

3 = COO group

Step 2

The group contribution values of each functional group occurence are tabulated (as shown in Table 4).

TABLE 4

| Group n° | Group Type | # of occurances | Group contr. Value | Total group contr. Value |
|---|---|---|---|---|
| 1 | Unsat. =CH$_2$ | 2 | 259 | 518 |
| 2 | Unsat. =CH— | 2 | 249 | 498 |
| 3 | Carboxylic —COO— | 2 | 688 | 1376 |
| 4 | Sat. —CH$_2$— | 2 | 269 | 538 |
| 5 | Sat. =C= | 1 | 65 | 65 |
| 6 | Methyl —CH$_3$ | 2 | 303 | 606 |

Step 3

The total group contribution values are added, then multiplied by the monomer density, with the resultant number being divided by the monomer molecular weight. This yields the solubility parameter for the monomer.

Density of neopentylglycol diacrylates=1.031, and the molecular weight is 212 (Sartomer Co. Data).

(518+498+1376+65+606)=3601

(3601*1.031/212=17.51 (MPa)$^{1/2}$*{(cal/cm$^3$)$^{1/2}$/2.046 (MPa)$^{1/2}$}=8.56 (cal/cm$^3$)$^{1/2}$.

Examples 4 to 28

PC lenses as in the previous examples, are washed with soap and water and rinced with deionized water prior to drying with compressed air. Then, they are blown with antistatic air and placed in the lens holder of a membrane apparatus. 5 drops of adhesive (previously filtered through a 0.45 µm syringe filter) are applied on the back of the lenses: one drop in the center, and four drops equally distant from the first drop, on the corner of a 1.6 cm$^2$ square. Then, a multilayer coating as in the previous examples is transferred on the backside of the lenses using a manual membrane apparatus or an automated membrane apparatus.

The transfer parameters using the manual apparatus are as follows:

Distance between stage and membrane ring: 31 mm

Membrane pressure (pressure applied by the membrane on the mold): 12 psi (0.827 bar)

UV irradiation: Dymax 5000-EC flood UV light with D bulb part no. 38560, intensity 135 mW/cm$^2$ Exposure (curing) time: 30 seconds Total BST process time: 65 seconds The transfer parameters using the automated membrane apparatus are as follows:

Distance between stage and membrane ring: 27.5 mm

Membrane pressure: 12 psi (0.827 bar)

Inflation time: 21-23 seconds

Deflation time: 3 seconds

UV irradiation: UV lamp

Xenon (890-1866 B)

4.2" spiral lamp (ozone free)

pulsed UV (100 PPS).

Exposure (curing) time: 25 seconds

Total BST process time: 120 seconds

After transfer of the multilayer coating, the lens-carrier assemblies are edged on a slow cycle using a Horizon 2® edge (air pressure 10-12 psi (0.689-0.827 bar)). Finally, the carriers are blown apart from the lenses using compressed air.

Adhesive composition formulations and properties are gathered in tables 5, 6 and 7.

Examples 4 to 23 are performed using the automated membrane apparatus, whereas examples 24 to 28 are performed using the manual membrane apparatus.

TABLE 5

| Formulation (wt %) | EXAMPLE | | | | | | | | | |
|---|---|---|---|---|---|---|---|---|---|---|
| | 4 | 5 | 6 | 7 | 8 | 9 | 10 | 11 | 12 | 13 |
| Diethyleneglycoldiacrylate (SR 230) | 28.9 | 28.8 | 28.9 | 55.0 | 48.7 | 39.0 | 48.7 | 38.6 | 28.8 | 28.7 |
| 4EO Bisphenol-A dimethacrylate (CD 540) | 29.1 | 29.2 | 38.7 | 31.6 | 29.3 | 28.9 | 29.4 | 29.3 | 29.1 | 29.7 |
| BMTPS | 29.0 | 29.0 | 29.5 | 9.9 | 9.0 | 9.1 | 18.9 | 18.9 | 19.0 | 28.7 |
| BMTES | — | — | — | — | — | — | — | — | — | — |
| Benzylacrylate | 10.1 | — | — | — | — | — | — | — | — | — |
| Benzylmethacrylate | — | 10.0 | — | — | 10.0 | 19.9 | — | 10.1 | 20.0 | 9.9 |
| IRGACURE ® 819 | 2.9 | 3.0 | 2.9 | 3.5 | 3.0 | 3.0 | 3.1 | 3.1 | 3.1 | 3.0 |

| Formulation (wt %) | EXAMPLE | | | | | | | | | |
|---|---|---|---|---|---|---|---|---|---|---|
| | 14 | 15 | 16 | 17 | 18 | 19 | 20 | 21 | 22 | 23 |
| Diethyleneglycoldiacrylate (SR 230) | 18.9 | 9.0 | 58.9 | 48.6 | 38.9 | 38.5 | 28.8 | 18.9 | 9.8 | 24.3 |
| 4EO Bisphenol-A dimethacrylate (CD 540) | 29.2 | 29.4 | 29.0 | 29.3 | 29.2 | 29.8 | 29.1 | 29.3 | 31.3 | 29.1 |
| BMTPS | 28.8 | 28.7 | 9.0 | 19.0 | 18.9 | 28.7 | 28.8 | 28.9 | 31.5 | — |
| BMTES | — | — | — | — | — | — | — | — | — | 43.7 |
| Benzylacrylate | — | — | — | — | 10.0 | — | 10.2 | 19.9 | 24.2 | — |
| Benzylmethacrylate | 20.1 | 29.9 | — | — | — | — | — | — | — | — |
| IRGACURE ® 819 | 3.0 | 3.0 | 3.1 | 3.0 | 3.0 | 3.0 | 3.0 | 3.0 | 3.2 | 2.9 |

BMTPS = bis(methacryloylthiophenyl)sulfide
BMTPS = bis(methacryloylthioethyl)sulfide

TABLE 6

| Properties | EXAMPLE | | | | | | | | | |
|---|---|---|---|---|---|---|---|---|---|---|
| | 4 | 5 | 6 | 7 | 8 | 9 | 10 | 11 | 12 | 13 |
| Formulation (before BST[1]) | * | ** | — | — | — | — | — | — | — | — |
| Refractive index of adhesive at 25° C., before cure | | | | 1.5020 | 1.5075 | 1.5125 | 1.5220 | 1.5265 | 1.5320 | 1.5430 |
| HMC[2] transfer | yes | yes | yes | yes | yes | yes | Yes | yes | yes | yes |
| Haze | no | no | no | no | no | no | No | no | no | no |
| Application stain | no | no | no | no | no | no | No | no | no | no |
| Adhesion | good | good | good | good | good | good | Good | good | good | good |

| Properties | EXAMPLE | | | | | | | | |
|---|---|---|---|---|---|---|---|---|---|
| | 14 | 15 | 16 | 17 | 18 | 19 | 20 | 21 | 22 |
| Formulation (before BST[1]) | — | — | — | — | — | * | * | * | — |
| Refractive index of adhesive at 25° C., before cure | 1.5500 | 1.5545 | — | 1.5215 | 1.5265 | 1.5405 | 1.545 | 1.551 | 1.557 |
| HMC[2] transfer | yes | yes | yes | yes | yes | yes | yes | yes | yes |
| Haze | no | no | no | no | no | no | no | no | no |
| Application stain | no | no | no | no | no | no | no | no | no |
| Adhesion | good | good | good | good | good | good | good | good | good |

[1]BST = Backside treatment
[2]HMC = multilayer coating
* Needed heat to dissolve
** Needed heat to dissolve. Precipitated after ≈1 hour at room temperature. Needed heat for redissolution.

TABLE 7

| | EXAMPLE | | | | |
|---|---|---|---|---|---|
| | 24 | 25 | 26 | 27 | 28 |
| Formulation wt % | | | | | |
| Diethyleneglycoldiacrylate (SR 230) | 29.0 | 38.7 | 48.6 | 29.0 | 39.0 |
| 4EO bisphenol-A dimethacrylate (CD 540) | 39.0 | 39.3 | 39.5 | 49.1 | 48.9 |
| BMTPS | 29.0 | 19.0 | 8.9 | 18.9 | 9.0 |
| IRGACURE ® 819 | 3.0 | 3.0 | 3.0 | 3.0 | 3.0 |
| Properties | | | | | |
| Formulation (before BST) | * | — | — | — | — |
| Refractive index of adhesive at 25° C. before cure | 1.546 | 1.5285 | 1.5025 | 1.535 | 1.5165 |
| HMC transfer | Good | good | good | good | good |
| Haze | No | no | no | no | no |
| Application stain | No | no | no | no | no |
| Adhesion | 0 | 0 | 0 | 0 | 0 |

The above results show that the adhesive compositions of the invention lead to coated lenses, using BST process, which have good adhesion of the coating to the substrate, no haze, no application stain and at least acceptable critical temperature Tc.

The invention claimed is:

1. A photocurable adhesive composition consisting of, based on the total weight of the photopolymerizable monomers and/or oligomers of the composition:
   15 to 60 wt % of at least one diacrylate monomer or oligomer thereof or a mixture of at least one non-aromatic diacrylate monomer or oligomer thereof and at least one aromatic acrylate monomer (A);
   5 to 50 wt % of at least one thio(meth)acrylate monomer or oligomer thereof (B), bearing at least one functional group

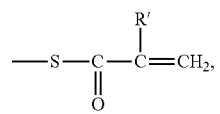

in which R' is H or —CH$_3$;
   20 to 50 wt % of at least one aromatic dimethacrylate monomer or oligomer thereof (C);
   0% or 10 to 30 wt % of a monomethacrylate monomer (D); and
   at least one photoinitiator;
   with the proviso that the composition does not contain a brominated monofunctional acrylate.

2. The composition of claim 1, wherein:
   (B) is at least 9 wt %; and
   (C) is at least 25 wt %.

3. The composition of claim 1, wherein:
(A) is 20 to 60 wt % of at least one diacrylate monomer or oligomer thereof;
(B) is 20 to 50 wt % of at least one thio(meth)acrylate monomer or oligomer thereof and
(C) is 20 to 40 wt % based on the total weight of the photopolymerizable composition of at least one aromatic dimethacrylate monomer or oligomer thereof.

4. The composition of claim 1, wherein (A) is 20 to 60 wt %, (B) is 30 to 50 wt % and (C) is 20 to 40 wt %.

5. The composition of claim 1, wherein:
(A) is 20 to 50 wt % of at least one diacrylate monomer or oligomer thereof;
(B) is 30 to 50 wt % of at least one thio(meth)acrylate monomer or oligomer thereof; and
(C) is 20 to 40 wt % of at least one aromatic dimethacrylate monomer or oligomer thereof.

6. The composition of claim 1, consisting of:
20 to 40 wt % of at least one diacrylate monomer or oligomer thereof (A);
35 to 45 wt % of at least one thio(meth)acrylate monomer or oligomer thereof (B); and
25 to 35 wt % of at least one aromatic dimethacrylate monomer or oligomer thereof (C).

7. The composition of claim 1, wherein said at least one diacrylate monomer (A) has a calculated solubility parameter ranging from 8 to 12 $(cal/cm^3)^{1/2}$.

8. The composition of claim 7, wherein said at least one diacrylate monomer (A) has a calculated solubility parameter ranging from 8.5 to 11.5 $(cal/cm^3)^{1/2}$.

9. The composition of claim 1, wherein said at least one diacrylate monomer (A) has a molecular weight <500.

10. The composition of claim 9, wherein said at least one diacrylate monomer (A) has a molecular weight ≦350.

11. The composition of claim 1, wherein said at least one monomer (A) is a low refractive index monomer.

12. The composition of claim 1, wherein monomer (A) is diethyleneglycol diacrylate, triethyleneglycol diacrylate, tetraethyleneglycol diacrylate, neopentylglycoldiacrylate, or 1,6-hexanediol diacrylate.

13. The composition of claim 1, wherein the at least one thio(meth)acrylate monomer (B) is a high refractive index monomer.

14. The composition of claim 1, wherein the at least one thio(meth)acrylate monomer (B) is a monomer of formula:

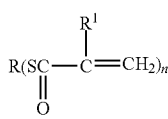

(I)

wherein:
R is a linear or branched, monovalent or polyvalent, aliphatic hydrocarbon radical, or a monovalent or polyvalent aromatic group directly linked to the sulfur atom of the thio(meth)acrylate group(s) through an aromatic ring or by means of a linear alkyl chain, the radical R may include in its chain one or more of:

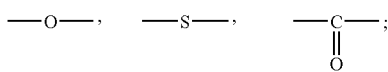

$R^1$ is H or —$CH_3$; and
n is an integer from 1 to 6.

15. The composition of claim 1, wherein the at least one aromatic dimethacrylate monomer (C) is an ethoxylated bisphenol-A monomer.

16. The composition of claim 1, wherein the photoinitiator represents 0.1 to 5 parts by weight for 100 parts by weight of the polymerizable monomers and/or oligomers.

17. The composition of claim 1, wherein, after curing, the adhesive composition has a refractive index of 1.53 to 1.65.

18. A process comprising:
providing a thermoplastic material substrate having at least one main surface;
providing a support having an internal surface bearing a coating and an external surface;
depositing on the main surface of the substrate or on the coating a pre-measured amount of a photocurable adhesive composition consisting of, based on total weight of photopolymerizable monomer and/or oligomers of the composition:
15 to 60 wt % of at least one diacrylate monomer or oligomer thereof or a mixture of at least one non-aromatic diacrylate monomer or oligomer thereof and at least one aromatic acrylate monomer (A);
5 to 50 wt % of at least one thio(meth)acrylate monomer or oligomer thereof (B), and at last one functional group

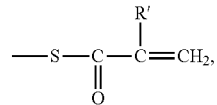

in which R' is H or —CH3;
20 to 50 wt % of at least on aromatic dimethacrylate monomer or oligomer thereof, (C);
0% or 10 to 30 wt % of a monomethacrylate monomer (D); and
at least one photoinitiator;
with the proviso that the composition does not contain a brominated monofunctional acrylate;
moving relatively to each other the substrate and the support to either bring the coating into contact with the curable adhesive composition or bring the curable adhesive composition into contact with the main surface of the substrate;
applying a sufficient pressure onto the external surface of the support so that the thickness of a final adhesive layer, once the curable adhesive composition has cured is less than 100 μm;
curing the layer of adhesive composition; and
withdrawing the support to recover a substrate with the coating adhered onto its main surface.

19. The process of claim 18, wherein:
(B) is at least 9 wt %; and
(C) is at least 25 wt %.

20. The process of claim 18, wherein:
(A) is 20 to 60 wt % at least one diacrylate monomer or oligomer thereof;
(B) is 20 to 50 wt % of at least one thio(meth)acrylate monomer or oligomer thereof; and
(C) is 20 to 40 wt % based on the total weight of the photopolymerizable composition of at least one aromatic dimethacrylate monomer or oligomer thereof.

21. The process of claim 18, wherein (A) is 20 to 60 wt %, (B) is 30 to 50 wt % and (C) is 20 to 40 wt % of (C).

22. The process of claim 18, wherein:
(A) is 20 to 50 wt % of at least one diacrylate monomer or oligomer thereof;
(B) is 30 to 50 wt % of at least one thio(meth)acrylate monomer or oligomer thereof; and
(C) is 20 to 40 wt % of at least one aromatic dimethacrylate monomer or oligomer thereof.

23. The process of claim 18, wherein:
(A) is 20 to 40 wt % of at least one diacrylate monomer or oligomer thereof;
(B) is 35 to 45 wt % of at least one thio(meth)acrylate monomer or oligomer thereof; and
(C) is 25 to 35 wt % of at least one aromatic dimethacrylate monomer or oligomer thereof.

24. The process of claim 18, wherein the thermoplastic material of the substrate is a high refractive index material.

25. The process of claim 18, wherein the thermoplastic material of the substrate is polycarbonate.

26. The process of claim 18, wherein said at least one diacrylate monomer (A) has a calculated solubility parameters ranging from 8 to 12 $(cal/cm^3)^{1/2}$.

27. The process of claim 26, wherein said at least one diacrylate monomer (A) has a calculated solubility parameter ranging from 8.5 to 11.5 $(cal/cm^3)^{1/2}$.

28. The process of claim 18, wherein said at least one diacrylate monomer (A) has a molecular weight <500.

29. The process of claim 28, wherein said at least one monomer (A) has a molecular weight ≦350.

30. The process of claim 18, wherein said at least one monomer (A) is a low refractive index monomer.

31. The process of claim 18, wherein monomer (A) is diethyleneglycol diacrylate, triethyleneglycol diacrylate, tetraethyleneglycol diacrylate, neopentylglycoldiacrylate, or 1,6-hexanediol diacrylate.

32. The process of claim 18, wherein the said at least one thio(meth)acrylate monomer (B) is a high refractive index monomer.

33. The process of claim 18, wherein the at least one thio(meth)acrylate monomer (B) is a monomer of formula:

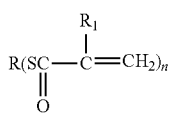

(I)

wherein:
R is a linear or branched, monovalent or polyvalent, aliphatic hydrocarbon radical, or a monovalent or polyvalent aromatic group directly linked to the sulfur atom of the thio(meth)acrylate group(s) through an aromatic ring or by means of a linear alkyl chain, the radical R may include in its chain one or more of:

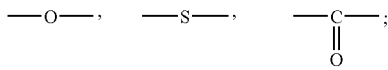

$R^1$ is H or —$CH_3$; and
n is an integer from 1 to 6.

34. The process of claim 33, wherein n is an integer from 1 to 3.

35. The process of claim 18, wherein the at least one aromatic dimethacrylate monomer (C) is a ethoxylated bisphenol-A monomer.

36. The process of claim 18, wherein the photoinitiator represents 0.1 to 5 parts by weight for 100 parts by weight of the photopolymerizable monomers.

37. The process of claim 18, wherein the substrate is a lens blank, and the main surface is a geometrically defined surface of the lens blank.

38. The process of claim 37, wherein the support is made of polycarbonate.

39. The process of claim 37, wherein the support is a flexible support part having an internal surface conformable to a geometrically defined surface of the lens blank when brought into contact therewith.

40. The process of claim 39, wherein the flexible support is urged against the lens blank by means of an inflatable membrane.

41. The process of claim 18, wherein the support is made of polycarbonate.

42. The process of claim 18, wherein the support has a thickness of 0.3 to 1 mm.

43. The process of claim 18, wherein the thickness of the final cured adhesive layer is less than 80 µm.

44. The process of claim 18, wherein the thickness of the final cured adhesive layer is less than 50 µm.

45. The process of claim 18, wherein the final cured adhesive layer has a refractive index of 1.53 to 1.65.

46. The process of claim 18, wherein the exerted pressure ranges from 5 to 50 Psi (0.35 to 3.5 $kgf/cm^3$).

47. The process of claim 18, wherein the coating comprises a hydrophobic top coat, an anti-reflective coating layer, an anti-abrasion coating layer, an impact resistant coating layer, a photochromic coating layer, a dying coating layer a polarized coating layer, a printed layer or a stack of two or more of these coating layers.

48. The process of claim 47, wherein the coating has a thickness of 50 µm or less.

49. The process of claim 18, wherein the substrate is a semi-finished lens having one face already provided with a coating.

50. The process of claim 49, wherein the face already provided with a coating is the front face of the lens and the geometrically defined surface onto which the coating is transferred is the back surface of the lens.

51. A process which comprises:
providing a thermoplastic material substrate having at least one main surface;
providing a mold part having an internal surface and an external surface;
depositing on the main surface of the substrate or on the internal surface of the mold part a pre-measured amount of a photocurable adhesive composition consisting of, based on the total weight of photopolymerizable monomers and/or oligomers of the composition:
15 to 60 wt % of at least one diacrylate monomer or oligomer thereof or a mixture of at least one non-aromatic diacrylate monomer or oligomer thereof and at least one aromatic acrylate monomer (A);
5 to 50 wt % of at least one thio(meth)acrylate monomer or oligomer thereof (B), and at last one functional group

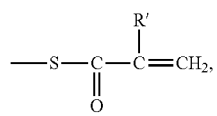

in which R' is H or —CH3;
20 to 50 wt % of at least on aromatic dimethacrylate monomer or oligomer thereof, (C);
0% or 10 to 30 wt % of a monomethacrylate monomer (D); and
at least one photoinitiator;
with the proviso that the composition does not contain a brominated monofunctional acrylate;
moving relatively to each other the substrate and the mold part to either bring the internal surface of the mold part or the main surface of the substrate in contact with the curable adhesive composition;
applying a sufficient pressure onto the external surface of the mold part to uniformly spread the curable adhesive composition and form a uniform layer, which, when cured, has a thickness of at least 200 µm.
curing the layer of adhesive composition; and
withdrawing the mold parts to recover the substrate overmolded with a cured layer of the curable adhesive composition.

52. The process of claim 51, wherein:
(B) is at least 9 wt %; and
(C) is at least 25 wt %.

53. The process of claim 51, wherein:
(A) is 20 to 60 wt % at least one diacrylate monomer or oligomer thereof;
(B) is 20 to 50 wt % of at least one thio(meth)acrylate monomer or oligomer thereof; and
(C) is 20 to 40 wt % based on the total weight of the photopolymerizable composition of at least one aromatic dimethacrylate monomer or oligomer thereof.

54. The process of claim 53, wherein (A) is 20 to 60 wt %, (B) is 30 to 50 wt % and (C) is 20 to 40 wt %.

55. The process of claim 51, wherein:
(A) is 20 to 50 wt % of at least one diacrylate monomer or oligomer thereof;
(B) is 30 to 50 wt % of at least one thio(meth)acrylate monomer or oligomer thereof; and
(C) is 20 to 40 wt % of at least one aromatic dimethacrylate monomer or oligomer thereof.

56. The process of claim 51, wherein:
(A) is 20 to 40 wt % of at least one diacrylate monomer or oligomer thereof;
(B) is 35 to 45 wt % of at least one thio(meth)acrylate monomer or oligomer thereof; and
(C) is 25 to 35 wt % of at least one aromatic dimethacrylate monomer or oligomer thereof.

57. The process of claim 51, wherein a coating to be transferred is applied to the internal surface of the mold part before depositing the curable adhesive composition.

58. The process of claim 51, wherein the overmolded cured layer of curable adhesive composition has a thickness of at least 500 µm.

59. A process comprising:
depositing a pre-measured amount of a photocurable adhesive composition on a main surface of a first part made of thermoplastic material;
bringing into contact the deposited photocurable adhesive composition with a main surface of a second part made of thermoplastic material;
pressing the first and second parts against each other to uniformly spread the photocurable adhesive composition to form a uniform thin layer; and photocuring the thin layer to obtain a laminated article, wherein the photocurable adhesive composition consists of, based on total weight of photopolymerizable monomers and/or oligomers of the composition:
15 to 60 wt % of at least one diacrylate monomer or oligomer thereof or a mixture of at least one non-aromatic diacrylate monomer or oligomer thereof and at least one aromatic acrylate monomer (A);
5 to 50 wt % of at least one thio(meth)acrylate monomer or oligomer thereof (B), and at last one functional group

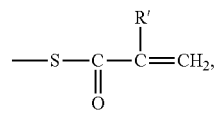

in which R' is H or —CH3;
20 to 50 wt % of at least on aromatic dimethacrylate monomer or oligomer thereof, (C);
0% or 10 to 30 wt % of a monomethacrylate monomer (D); and
at least one photoinitiator;
with the proviso that the composition does not contain a brominated monofuntional acrylate.

60. The process of claim 59, wherein the article is an ophthalmic lens.

61. The photocurable adhesive composition of claim 1, wherein (D) is 10 to 30 wt % of a monomethacrylate monomer.

62. The photocurable adhesive composition of claim 1, wherein (D) is 10 to 30 wt % of a monomethacrylate monomer, and is further defined as an aromatic monomethyacrylate monomer.

63. The photocurable adhesive composition of claim 1, wherein (A) is 15 to 60 wt % of at least one non-aromatic diacrylate monomer or oligomer thereof or a mixture of at least one non-aromatic diacrylate monomer or oligomer thereof and at least one aromatic monoacrylate monomer.

64. The photocurable adhesive composition of claim 1, wherein (A) is 15 to 60 wt % of at least one non-aromatic diacrylate monomer or oligomer thereof or a mixture of at least one non-aromatic diacrylate monomer or oligomer thereof and at least one aromatic monoacrylate monomers, and wherein (D) is a an aromatic monomethacrylate monomer.

* * * * *